Aug. 15, 1944.  F. B. HOPEWELL  2,355,803
WINDOW UNIT
Filed Dec. 8, 1943  3 Sheets-Sheet 1
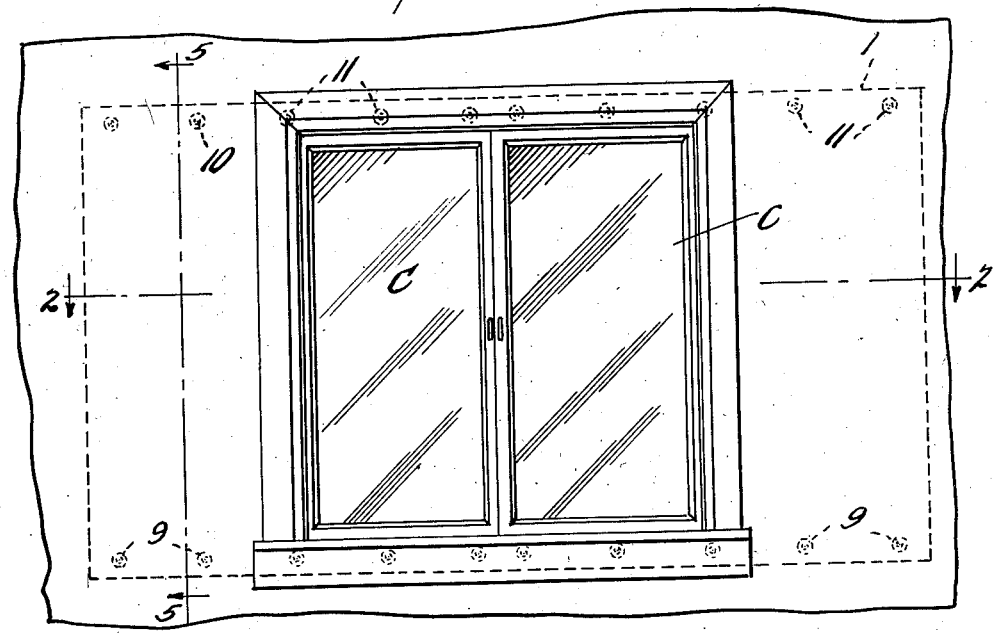
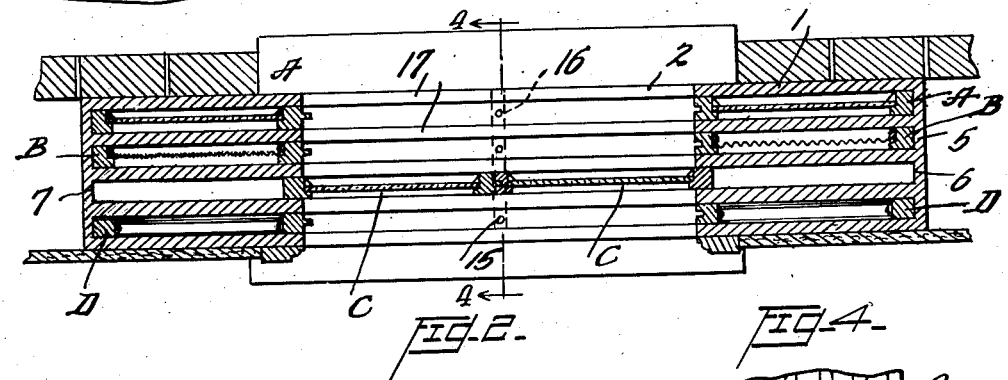
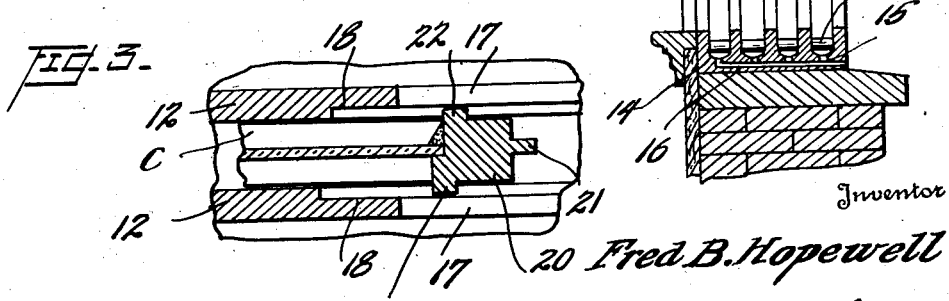
Inventor
Fred B. Hopewell
By Parker Cook
Attorney

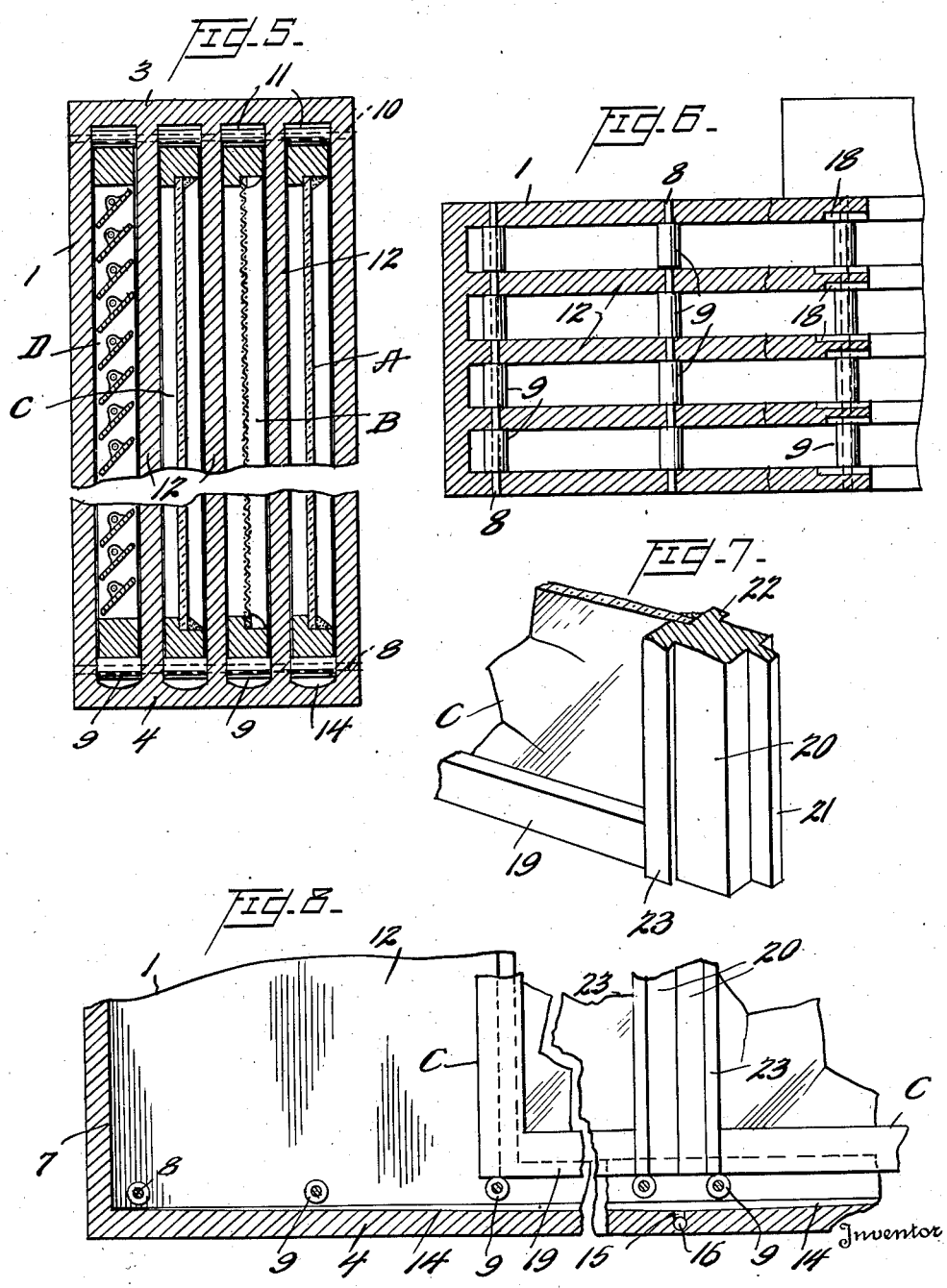

Aug. 15, 1944.　　F. B. HOPEWELL　　2,355,803
WINDOW UNIT
Filed Dec. 8, 1943　　3 Sheets-Sheet 3

Inventor
Fred B. Hopewell
By Parker Cook
Attorney

Patented Aug. 15, 1944

2,355,803

UNITED STATES PATENT OFFICE 2,355,803

WINDOW UNIT

Fred B. Hopewell, Bargaintown, N. J.

Application December 8, 1943, Serial No. 513,425

5 Claims. (Cl. 160—33)

My invention relates to a new and useful improvement in window units and has for an object to provide a unit that may be readily installed during the construction of dwelling houses, apartments, etc., and has for an object to provide a unit that will include storm windows, screens, window-panes, and blinds such as Venetian blinds or curtains in the form of plastic sheets.

As is well known to those skilled in the art in the ordinary installation of windows and their frames, provision is not made for a storm window or screens or blinds, but these are all purchased separately and then later installed.

Furthermore, in a number of localities the storm windows are taken down in the spring and the screens are taken down in the fall and stored in the cellar or attic or other suitable place.

Another object of the present invention, therefore, is to provide a unit with all these aforementioned parts as being a part of the unit and when it is desired for instance to dispense with the storm window or windows (as they are generally made in two parts) these windows will simply be moved back into the frame and out of the way. Likewise, the screens may also be slid back in their unit so that it will not be necessary to bodily remove them from the unit and pack them away and store them.

Still another object of the invention is to provide an all-inclusive window unit that may be used in the walls of the house and to provide two slightly modified forms that may be used in the corner of the apartments or dwellings and in this instance rather than having the storm windows proper and the screens proper formed in two halves, they will be each made in one piece and provision will be made for them to be housed in the one side of the unit rather than in the opposite sides.

Still another object of the invention is to provide an all-inclusive window unit wherein the several parts may be moved into and out of position and wherein the bottom of the unit is so arranged that rain water will drain from the lower sill.

Still another object of the invention is to provide a unit that may be quickly and readily manufactured and the parts all assembled so that it is but a simple matter for a carpenter to set the units in position.

With these and other objects in view, the invention consists in certain new and novel arrangements and combination of parts as will be hereinafter more fully described and pointed out in the claims.

Referring now to the drawings showing a preferred embodiment and two modified forms;

Fig. 1 is a front elevation view showing the unit as installed in the wall of a dwelling house or apartment;

Fig. 2 is a horizontal sectional view taken on line 2—2 of Fig. 1;

Fig. 3 is a fragmentary sectional view on an enlarged scale of a forward edge of the window sash within its frame;

Fig. 4 is a sectional view at the bottom of the device taken on line 4—4 of Fig. 2;

Fig. 5 is a sectional view taken on line 5—5 of Fig. 1 looking in the direction of the arrows;

Fig. 6 is a fragmentary enlarged sectional view of the base of the frame and the compartments in which the several sashes are to be housed;

Fig. 7 is a fragmentary perspective of the forward edge of one of the sashes;

Fig. 8 is an enlarged fragmentary side elevation partly in section showing a pair of the sashes positioned on rollers for easy movement;

Figure 9:
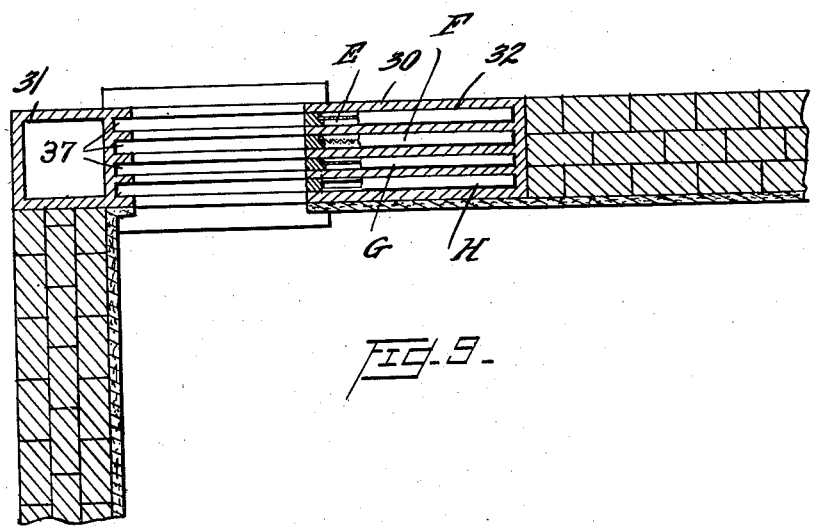
Fig. 9 is a horizontal sectional view of a slightly modified form where the unit is to be mounted in the corner of the building.

Referring now to the drawings and to the preferred form, and to Figs. 1 and 2 for the moment, there may be seen the unit frame 1 which is rectangular in shape and is preferably formed of metal. Centrally of the frame there is the opening 2 in which will be, when in their closed position, the storm window, screen, window-pane, and Venetian blinds as will be shortly mentioned.

Over the opening, of course, will extend the top piece 3 of the frame, and, likewise, there will be the bottom piece or sill 4.

To the one side of the opening, that is to the right in Fig. 2, the top, bottom, sides, and side wall 5 of the frame form a housing 6 for the respective halves of the various sashes, such as the storm window, window sash, etc., and, likewise, to the left side of the frame is the similar housing 7 that holds the other respective halves of the various sashes, that is the storm window, screen, etc.

The width of the frame is such that when the various sashes are in their open position, the outer edges of these sashes will all be substantially flush with the front edges of their respective housings as may be seen in Fig. 2, and when the elements are in their closed position, as illustrated by the window in Fig. 2, the rear edges of the sashes will be just behind the forward edge of the respective housings.

Still referring to Figs. 1 and 2, it will be understood that the housings 5 and 7 are identical but oppositely disposed so that a description of one will be a description of both.

Along the base 4 and extending laterally thereof, may be seen a plurality of short shafts 8 on which are mounted the rollers 9 and in like manner, as may be seen in Fig. 5, the top rail 3 is provided with a plurality of shafts 10 on which will be the respective rollers 11 so that the sashes mounted in the unit will slide freely between the rollers.

Also as may be seen in Fig. 5, there are the upright partition walls 12, there being three of these to thus form the four compartments within the housing.

It will be noticed that the various compartments for the sashes, as may be seen in Fig. 5, are slightly grooved out along their bottom in the sill forming runways as at 14 which decrease in depth from the opposite sides of the unit towards the center.

These grooved bottom walls are then drilled as at 15 about centrally of the unit to register with the transversely extending aperture 16, so that any rain water that settles into these compartments and the sill will freely drain from the unit.

It will be understood that the low partition walls 17, which bound the various runways in which the sashes are mounted, extend across the opening 2 of the unit and register at their opposite ends with the partition walls 12 heretofore mentioned.

In the frame will be mounted the storm window formed in two halves, the screens, the windows proper, and the Venetian blinds, likewise formed in two halves, and each sash whether it be the storm window or the screen or the window sash proper will have its own runway and compartment in which it will be housed, as may be readily seen from Fig. 2. By providing rollers at both top and bottom of the frame as heretofore mentioned there is no possibility of the various sashes sticking.

Furthermore, any rain water that runs or flows into the bottom of the frame will flow to the lowest point, that is the center of the sill, and then pass out through the opening 16 especially provided for the draining of the water.

In Fig. 3 it will be noticed that the partition walls 12 are grooved as at 18 along their vertical forward edges so that when the sashes are in their housed position the forward edges of the respective rails will form a water-tight joint with the partition walls to prevent the rain and air from passing into the compartments. The front rail of a tongued sash is illustrated fragmentarily in Fig. 7, and reference will now be made to the same.

Here is fragmentarily shown one of the sashes and here may be seen the bottom rail 19, the upright 20 provided with the outstanding tongue 21, and the integral sealing strip 22 on the one side and the sealing strip 23 on the other side that sets back slightly to the rear of the strip 22.

It is this upright with its sealing strips which latter fit into the grooves 18 in the partition walls 12 when the sash is housed in its compartment, and in this manner a water-tight seal is effected between the sash and the walls of its compartment.

The forward uprights of all the sashes housed in the left-hand housing are made with tongues 21 (Fig. 2) while the sashes fitted in the right-hand housing will be furnished with cooperating grooves so that when the halves are in their cooperating closed position air and water will be prevented from passing through the line of juncture.

Fitted within the unit and to slide on their respective rollers are the four sashes heretofore mentioned; that is, first, there will be the oppositely positioned sashes A which are the storm windows; located just behind the storm windows A will be the sashes B which are fitted with the screens; directly behind the screens are the sashes C with their window-panes therein; and last will be the sashes D in which may be the Venetian blinds or louvers.

Thus in winter-time, the two storm window sashes will be pulled towards each other and may be locked in position.

I have not shown the locks or pulls or other hardware but any desirable hardware may be fitted to the various sashes.

In the winter-time, the sashes with the screens therein may be rolled back into their respective housing, thus providing a clear vision through the storm window. The window sashes C may be pulled towards each other, that is closing the opening, to thus provide a dead air space between the storm window and the window proper.

At night the sashes D with the Venetian blinds may be closed. Furthermore, the sashes with their Venetian blinds therein may be left in their closed position and the shutters or louvers opened or closed as desired.

I have not shown the manner of opening and closing these louvers but it will be understood that any desirable means may be used.

Also when the storm windows are not needed, it is only necessary to slide them back in their respective compartments and here they may be safely stored until it is desired to use them. Also by providing the system for drainage of the rain water, any water that blows in or rains in will run towards the center of the sash and then from the sash out into the open.

Also by forming the forward uprights of the sashes as shown, no rain can blow in between the two halves when the windows are closed, and, likewise, when the sashes are pulled back in their housing the protecting strips inter-fit with the vertical edges of the compartments to keep the water and snow out of the housing parts of the frame.

Figure 10:
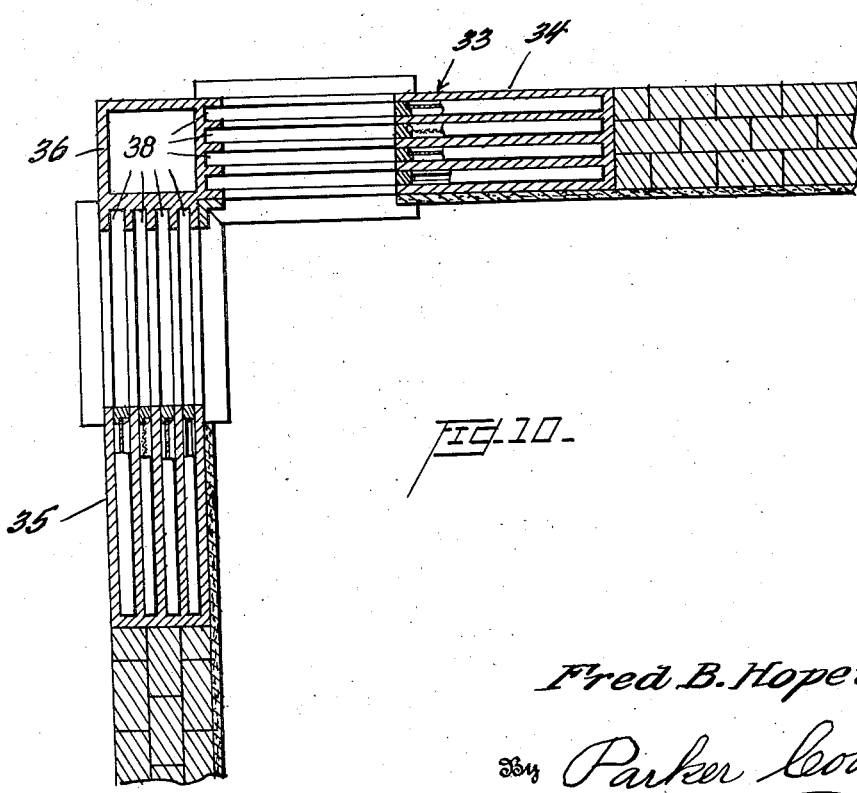
Fig. 10 is a view similar to Fig. 9 showing a further modification wherein the unit is L-shaped and fitted in a corner.

Referring now to Figs. 9 and 10 showing two slight modifications, it will be understood that it may be desired to install one of these units in a corner of a room and in this instance rather than having the respective sashes made in two halves they are made in single units and slide back into but one housing.

Referring to Fig. 9 for the moment there may be seen the rectangular frame 30 with its corner post 31 and its housing compartment 32.

In this unit will be housed the storm window sash E, the screen sash F, the window sash G and the Venetian blind sash H. Although I have not shown the drain or the rollers, etc., it will be understood that these are formed in exactly the same manner as in the preferred form but rather than the water running from the two opposite sides towards the center the drainage water will run from the housing down towards the post 31 and then out. The post 31 may be provided with grooves 37 to receive the tongues on the forward edges of the sashes which are illustrated in the preferred form.

Referring to Fig. 10 it will be understood that here again we have the frame 33 made L-shape in top plan, having a leg 34 and a leg 35 and the corner post 36. In each leg will be housed the sashes in the same manner in which the sashes are housed in the unit shown in Fig. 9, while the forward edges of the sashes when open will fit within the respective grooves 38 in the corner post 36. By making the frame this shape we can have the various sashes positioned at right angles with respect to each other and the unit will fit in the corner or corners of the dwelling house or apartments to thus get the light and air from both sides of the corners.

From the foregoing it will be seen that I have provided a unit which will contain not only the window sashes but the storm sashes, screens and blinds so that they can be used individually or collectively as desired, it not being necessary to take down the sashes and store them as is now generally the case.

In most instances the unit to be used will be the one shown in the preferred form and here it is to be remembered that the sashes are divided into two like halves but where space does not permit near the corner of a building, the unit may be made so that the sashes not in use will be housed at one side of the unit rather than at both sides of the unit.

Finally where it is desired to have a unit right in the corner and windows facing from both walls the L-shaped unit may be used.

It will also be understood that units of these kinds may be readily made in the factory and readily installed. It will also be seen that I have done away with all pulleys, ropes and sash weights which are generally used in vertically movable windows.

Many slight changes might be made without in any way departing from the spirit and scope of the invention.

Having thus described my invention, what I claim as new and desire to secure by Letters Patent is:

1. In a window unit a unitary metal frame including uprights and cross pieces, a housing formed within the frame, the said housing provided with a plurality of integral spaced compartments, the bottom cross piece of the frame also provided with relatively shallow integral runways registering with their respective compartments, rollers mounted along said runways, a storm sash, a screen sash, a window sash, and a shutter sash positioned in said runways, mounted on said rollers and adapted to be individually rolled back into their respective compartments when not in use and run forwardly when they are to be in their closed position, and the bottom of the runways provided with openings arranged to drain any water from said unit.

2. In a window unit a unitary metal frame including uprights and cross pieces, opposed housings located within the frame, the said housings each provided with a plurality of spaced compartments, the bottom cross piece of the frame also provided with integral relatively shallow runways registering with their respective compartments, rollers mounted along said runways, a storm sash, screen sash, window sash and shutter sash each formed of like cooperating halves fitted within the said runways and mounted on said rollers and adapted to be individually rolled back into their respective compartments when not in use, and run forwardly when they are to be in their closed position and the bottom of the runways provided with openings arranged to drain any water from said unit.

3. In a window unit a unitary metal rectangular frame including uprights and top and bottom cross pieces, housings formed within the opposite sides of the frame, the said housings each provided with a plurality of spaced compartments, the bottom cross pieces of the frame also provided with relatively shallow runways registering with their respective compartments, rollers mounted along said runways, a storm sash, a screen sash, a window sash and a shutter sash each formed of like cooperating halves with the exception that the forward uprights of the sashes to be housed in the one housing are tongued while the forward uprights to be positioned in the housings are grooved, the said sashes mounted on said rollers in said runways and adapted to be individually rolled back into their respective compartments when not in use and run forwardly so that the respective halves interlock when they are to be in their closed position, and the said bottom cross piece provided with passageways to drain any water from the unit.

4. In a window unit a unitary metal frame including uprights and cross pieces, a housing formed in one side of the frame, the said housing provided with a plurality of spaced compartments, the bottom cross piece of the frame also provided with channel like guides registering with their respective compartments, rollers mounted across said guides, the upright opposite the housing provided with a plurality of receptive grooves, a storm sash, screen sash, window sash and a shutter sash, positioned in said guides, all of said sashes provided with tongues along the outer edges, the said sashes mounted on said rollers and adapted to be individually rolled back into their respective compartments when not in use and run forwardly when they are to be in their closed position, so that the tongues on the window sashes inter-fit with said grooves, and the bottom of the guides provided with openings adapted to drain any water from said unit.

5. In a window unit a metal frame L-shape in top plan, a center upright common to both legs of the frame, each of the legs of the frame also including a top piece, upright and bottom piece, each of the legs also having an open housing near its one end and each of the housings provided with compartments, runways in each of the bottom pieces registering with their respective compartments, a storm sash, screen sash, window sash and a shutter sash positioned in each leg of said frame and the respective sashes when not in use to be rolled back in said housings and adapted to slide forward and towards each other to inter-fit with the common upright when the sashes are in their closed position.

FRED B. HOPEWELL.